J. FREDRICKSON.
BEARING FOR CAR AXLES.
APPLICATION FILED NOV. 22, 1912.
1,067,727.
Patented July 15, 1913.
2 SHEETS—SHEET 1.
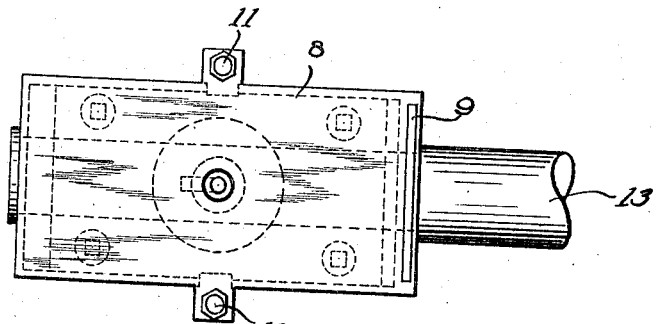
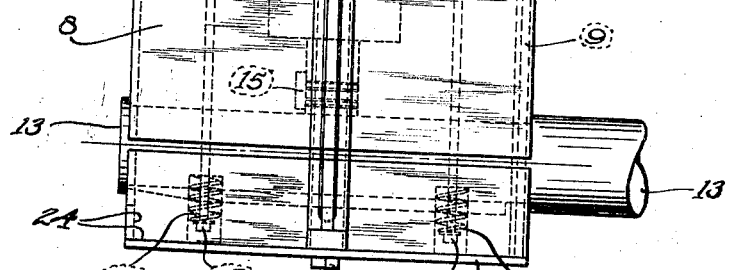
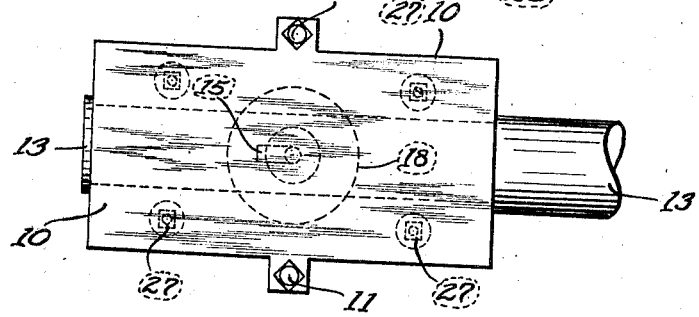
Witnesses:
Thomas J. Morgan Jr.
Gustave T. Fraenckel
Inventor–
John Fredrickson
By Morgan & Rubinstein
Atty's

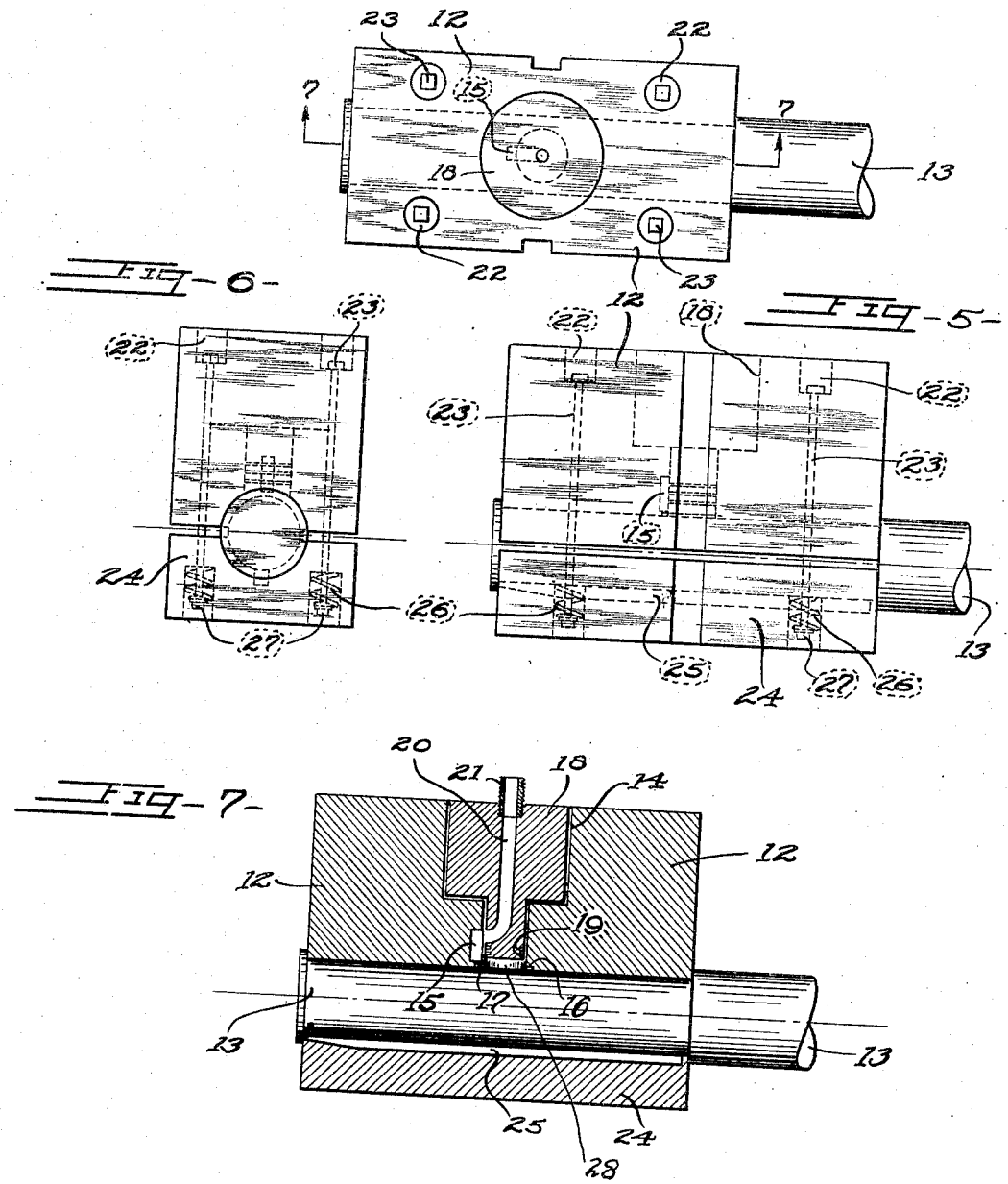

UNITED STATES PATENT OFFICE.

JOHN FREDRICKSON, OF MILLER, INDIANA.

BEARING FOR CAR-AXLES.

1,067,727.

Specification of Letters Patent.

Patented July 15, 1913.

Application filed November 22, 1912. Serial No. 732,947.

*To all whom it may concern:*

Be it known that I, JOHN FREDRICKSON, a citizen of the United States, and resident of Miller, in the county of Lake, State of Indiana, have invented a new and useful Improvement in Bearings for Car-Axles, of which the following is a specification.

The object of my invention is to provide a bearing by which the friction resulting in cut journals and hot boxes is prevented, and the bearings and journals can be preserved from the destructive effects common to those parts of the running supports of a car.

The manner in which I accomplish my object is described in the following specification and illustrated in the accompanying drawing in which:—

Figure 1 is a plan of a bearing box, the dotted lines indicating the bearing within the box. Fig. 2, is a side elevation of the parts shown in Fig. 1. Fig. 3, is a bottom plan of the parts shown in Fig. 2. Fig. 4 is a plan of the bearing in position on the axle. Fig. 5 is a side elevation of both parts of the bearing in position on the axle, the dotted lines indicating the connecting bolts and springs. Fig. 6, is an end elevation of the parts shown in Fig. 5. Fig. 7 is a central section on the line 7—7 Fig. 4.

In the drawings 8 indicates the box the exterior form of which can be made to fit the box holders forming part of the various car trucks in use. 9 indicates the aperture for the common dust guard in use. 10 indicates a bottom plate peculiar to this box the purpose of which is hereinafter described.

Forming part of the box, and part of the bottom plate are perforated projections through which bolts 11 extend, by which the plate 10 is removably secured to the box. Insertible in the box 8 is a bearing 12 the under part of which is adapted to rest on the axle 13 in the same manner as the ordinary car bearing. Extending vertically through the central part of this bearing is a bore 14. In the lower part of this bore is a recess forming a port 15, and a check 16 adapted to contain a packing ring 17. Insertible in this bore is a piston 18 the lower end of which is provided with packing rings 19. Extending vertically through this piston is a passage 20 which curves outward through the side of the lower end of the piston just above the packing rings 19, and registers with the port 15 when the piston is at rest in the bore. The top of the passage 20 is enlarged and threaded to receive and hold a pipe connection 21 the purpose of which is hereafter described. Extending vertically through the bearing 12 are four holes 22 for the passage of bolts 23. These bolts are adapted to support a lubricating bearing 24. The central portion of this bearing is recessed longitudinally as shown at 25 Fig. 7 and thereby adapted to contain lubricating material in contact with the whole length of the journal of the axle 13. For the purpose of securing and maintaining the adjustment of the bearing 24, springs 26 are provided which are compressed by the nuts 27 on the bolts 23. Access to these nuts is provided for by the removal of the plate 10 from the box 8.

When my device is constructed as described and placed in position in the car truck and on the journal of the axle, its operation and use is as follows:—The pipe connection 21 is connected up with the air brake pump or with any air pump on the trucks, car bottom or in the car. The air pump may be connected with the air brake, or axle so that its motion is automatic or under control of the engineer or motorman. The compressed air enters the passage 20, passes through the port 15 into the chamber 28 formed by the bore 14, end of the piston 18, and journal of the axle 13. The air pressure thus applied lifts the piston 18. The limit of the piston's movement being determined by the pressure and the cut off as the opening of the passage 20 is raised above the top of the port 15. As the piston is raised by the air pressure the box 8 is raised together with the arch bar (not shown) which rests upon the box. The weight of the car is thereby lifted from the bearing 8 and is sustained on the air which fills the chamber 28 of which the revolving journal of the axle forms the bottom wall.

The air tight connection of the bearing and axle is maintained under the air pressure by the packing ring 17 and the spring 26 which hold the bearing 8 in contact with the journal.

What I claim is:—

1. In a device of the kind described, the combination with means for holding a bearing on a journal, of a bearing adapted to rest on a journal, said bearing having a cylindrical bore therethrough and a port in said bore, a piston movable in said bore, having a passage therethrough adapted to register with said port, a chamber in said bearing formed by said bore, port, piston and journal wherein compressed air can raise said piston in said bore as described.

2. In a device of the kind described, the combination with a bearing box and a journal of an axle or shaft extending therethrough, of a bearing contained in said box and resting on said journal, said bearing having a cylinder bore and a port therein, a piston movable in said bore, said piston having a passage extending from the external end of said piston into said port, and a chamber formed by said bore, port, journal, and piston, whereby a fluid forced into said chamber lifts said piston, as and for the purpose described.

3. In a device of the kind described, the combination with a bearing box and an axle or shaft extending therethrough, of a bearing supported in said box and resting on said journal or shaft, said bearing having a bore and a port in said bore, a piston movable in said bore, said piston having a passage way adapted to communicate with said port and external portion of said piston, means insertible in said box adapted to contain a lubricating substance, and adjustable means connecting said bearing and said means whereby said lubricating material is held in contact with said journal or shaft as described.

4. In a device of the kind described, the combination with a box having open ends for the passage of an axle or shaft therethrough, and an open bottom for the insertion of bearing parts therein, a bottom plate and means for removably securing said plate and thereby closing the bottom of said box; of a bearing insertible in said box adapted to fit and rest upon an axle or shaft extending through said box, said bearing having a central bore therethrough, a port in said bore and circular check adapted to hold a packing ring, a packing ring held in said check adapted to be in contact with an axle or shaft on which said bearing is placed, a piston in said bore, having a passage way therethrough adapted to be opened and closed by the movement of said piston in said bore, a lubricating bearing and lubricating material therein insertible in said box, adjustable means adapted to connect said bearing and lubricating bearing and hold said parts in contact with an axle or shaft extending therethrough, and means for connecting said piston with a pressure pump whereby air or fluid is forced through said piston and port into a chamber formed by said bore, piston and axle or shaft and the piston thereby raised as and for the purpose described.

5. In combination, a journal box having a shaft bearing bore and a bore communicating with said first bore, the inner end of said second bore forming a chamber, and a piston movable in the second bore and having a passage therethrough communicating with said chamber and bores and adapted to be moved in said second bore by air forced through said passage.

JOHN FREDRICKSON.

Witnesses:
M. S. MONROE,
J. R. MULLEN.

---

Copies of this patent may be obtained for five cents each, by addressing the "Commissioner of Patents, Washington, D. C."